(12) United States Patent
Narita

(10) Patent No.: US 10,738,906 B2
(45) Date of Patent: Aug. 11, 2020

(54) ROTATION CONTROL APPARATUS

(71) Applicant: AZBIL CORPORATION, Chiyoda-ku (JP)

(72) Inventor: Hiroaki Narita, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 219 days.

(21) Appl. No.: 15/901,964

(22) Filed: Feb. 22, 2018

(65) Prior Publication Data

US 2018/0245704 A1    Aug. 30, 2018

(30) Foreign Application Priority Data

Feb. 24, 2017    (JP) ................................. 2017-034014

(51) Int. Cl.
| | |
|---|---|
| *G05D 7/00* | (2006.01) |
| *G05D 11/00* | (2006.01) |
| *F16K 31/04* | (2006.01) |
| *G05B 11/01* | (2006.01) |
| *G01D 5/14* | (2006.01) |
| *G05D 7/06* | (2006.01) |

(Continued)

(52) U.S. Cl.
CPC .......... *F16K 31/042* (2013.01); *F16K 31/043* (2013.01); *F16K 37/0033* (2013.01); *G01D 5/145* (2013.01); *G01D 5/252* (2013.01); *G05B 11/012* (2013.01); *G05D 7/0635* (2013.01); *F16K 37/0041* (2013.01)

(58) Field of Classification Search
CPC .. F16K 31/042; F16K 31/043; F16K 37/0033; F16K 37/0041; G01D 5/145; G01D 5/252; G05B 11/012; G05D 7/0635
See application file for complete search history.

(56) References Cited

U.S. PATENT DOCUMENTS 6,140,636 A * 10/2000 Norton ................. G01D 5/2457
250/231.18
8,024,956 B2 * 9/2011 Hammerschmidt ... G01D 5/145
73/1.11

(Continued)

FOREIGN PATENT DOCUMENTS

| JP | 2010-286444 | 12/2010 |
|---|---|---|
| JP | 2011-74935 | 4/2011 |

*Primary Examiner* — Zhipeng Wang
(74) *Attorney, Agent, or Firm* — Oblon, McClelland, Maier & Neustadt, L.L.P.

(57) ABSTRACT

A rotation control apparatus includes a relative position sensor that contactlessly detects the mechanical displacement amount of a shaft to be actuated in a direction of rotation, absolute position sensors that are provided at mutually different positions within a rotatable range of the shaft to be actuated and each output a detection signal when the shaft to be actuated has reached its corresponding position, and a position calculating unit that calculates an absolute position of the shaft to be actuated in the direction of rotation on the basis of an integrated value of the mechanical displacement amount since the detection signal is output and a reference value indicating a position corresponding to the absolute position sensor that has output the detection signal. At least one of the absolute position sensors is provided to correspond to a third position excluding a first position and a second position within the rotatable range.

14 Claims, 8 Drawing Sheets

(51) Int. Cl.
*F16K 37/00* (2006.01)
*G01D 5/252* (2006.01)

(56) References Cited

U.S. PATENT DOCUMENTS

| | | | |
|---|---|---|---|
| 8,937,473 B2 * | 1/2015 | Piaton | G01D 5/2451 |
| | | | 310/186 |
| 2017/0370961 A1 * | 12/2017 | Hashimoto | G01P 1/10 |
| 2018/0209819 A1 * | 7/2018 | Marshall | G01D 5/2454 |
| 2018/0328763 A1 * | 11/2018 | Schautt | G01D 5/34776 |

* cited by examiner

ROTATION CONTROL APPARATUS

CROSS-REFERENCE TO RELATED APPLICATIONS

The present application is based on and claims priority to Japanese Application No. 2017-034014, filed Feb. 24, 2017, the entire contents of which are incorporated therein by reference.

BACKGROUND

1. Field

The present disclosure relates to rotation control apparatuses that control rotation of a shaft to be actuated and relates, for example, to an electric-powered actuator that actuates a valve shaft of a control valve.

2. Description of the Related Art

Typically, a rotation control apparatus that controls rotation of a shaft to be actuated detects a mechanical displacement of the shaft in the direction of rotation with a position sensor and determines the amount by which the shaft is to be actuated on the basis of the detection result of the position sensor. For example, in an electric-powered actuator that actuates a valve shaft of a rotary-type control valve, such as a ball valve, a potentiometer constituted by a variable resistor is used as a position sensor, and the valve shaft is controlled on the basis of the mechanical displacement amount of the valve shaft in the direction of rotation detected by the potentiometer (see Japanese Unexamined Patent Application Publication No. 2011-74935).

In addition, aside from a contact-type position sensor represented by a potentiometer, known position sensors for measuring the mechanical displacement amount of a shaft in the direction of rotation include a contactless absolute position sensor that contactlessly detects an absolute position of a shaft to measured in the direction of rotation and a contactless relative position sensor that contactlessly detects a relative position of a shaft to be measured in the direction of rotation. For example, an absolute-type rotary encoder that outputs a code signal corresponding to an absolute angular position of a shaft to be detected is known as a contactless absolute position sensor, and an incremental-type rotary encoder that outputs a pulse corresponding to the angle of rotation of a shaft to be detected is known as a contactless relative position sensor (see Japanese Unexamined Patent Application Publication No. 2010-286444).

Typically, a potentiometer is a sensor that outputs a change in the resistance value arising as a wiper is mechanically actuated and thus tends to have a low durability and a short product lifetime. When, in place of a potentiometer, an absolute-type rotary encoder is used as an absolute contactless position sensor, the unit price of the components is typically high, and a separate battery needs to be provided to drive the absolute-type rotary encoder, leading to an increased product cost.

Accordingly, the inventor of the present application has looked into the use of a contactless position sensor, such as a rotary encoder, in place of a potentiometer in an electric-powered actuator that actuates a control valve. The result has revealed the following disadvantages.

When an incremental-type rotary encoder is used as a contactless relative position sensor in an electric-powered actuator, the number of pulses output from the rotary encoder needs to be counted from the starting point of the measurement (origin), and the absolute position, in the direction of rotation, of the valve shaft serving as a shaft to be actuated needs to be calculated on the basis of the integrated value of the number of the pulses. Therefore, immediately upon the actuator being powered on, "origin restoration" processing is essential in which the valve shaft is returned to the origin once and the integrated value of the number of the pulses output from the rotary encoder is reset.

When this "origin" in the origin restoration is set to the position of the valve shaft where the valve lift is fully closed (hereinafter, also referred to as a "fully closed position") or to the position of the valve shaft where the valve lift is fully open (hereinafter, also referred to as a "fully open position"), an electric-powered actuator that actuates a control valve suffers from a disadvantage in that it takes a long time to complete the origin restoration.

For example, an electric-powered actuator that actuates a control valve includes an electric motor and a reduction gear constituted by a gear mechanism that reduces the rotary torque of the electric motor. The electric-powered actuator rotates an output shaft with the rotary torque that has been reduced by the reduction gear to actuate the valve shaft coupled to that output shaft.

Typically, in an electric-powered actuator, the reduction ratio of this reduction gear is set to a several hundredths to a several thousandths. Thus, the time required for the valve shaft to move from the fully open position to the fully closed position (full stroke time) is too long to be negligible. For example, in a conventional electric-powered actuator, it takes approximately 60 seconds for the valve shaft to reach the fully closed position from the fully open position.

Therefore, if, in place of a potentiometer, an incremental-type rotary encoder is provided in the conventional electric-powered actuator and the origin of the valve shaft is set to the fully closed position, it takes at least 60 seconds to complete the origin restoration of the valve shaft that starts the origin restoration from the fully open position. Even when the origin is set to the fully open position, the origin restoration of the valve shaft from the fully closed position requires a similar amount of time.

In this manner, when, in place of a potentiometer, a contactless relative position sensor is used in an electric-powered control valve and the position of the origin in the origin restoration is set to the fully closed position or the fully open position, the standby time until the origin restoration is completed is disadvantageously extended.

In addition, when a contactless relative position sensor is used, the valve lift of the control valve may not be accurately controlled. For example, when an electric-powered actuator in which an incremental-type rotary encoder is used is operated for an extended period of time without carrying out the origin restoration, backlash generated in a gear constituting a reduction gear or the like when the direction of rotation of the valve shaft is switched accumulates, and an error arises in the result of measuring the valve lift. In addition, when an electric motor, such as a stepping motor or a synchronous motor, is used in an open loop, if the electric motor goes out of step, an error arises in the result of measuring the valve lift. In addition, in a synchronous motor, an error arises in the result of measuring the valve lift also through a fluctuation or the like in the power source frequency.

In this manner, when a relative contactless sensor is used in place of a potentiometer, an error in measuring the mechanical displacement amount of a valve shaft in the direction of rotation measured by the relative contactless sensor increases as backlash accumulates, as an electric motor in an open loop goes out of step, or as the power source frequency fluctuates, and the valve lift of the control valve may not be accurately controlled.

SUMMARY

The present disclosure has been made in view of the above and is directed to reducing the time it takes for origin restoration of a shaft to be actuated and reducing an error in measuring the position of the shaft to be actuated in a rotation control apparatus that measures the position of the shaft to be actuated in the direction of rotation with a contactless relative position sensor.

The present disclosure provides a rotation control apparatus (100) that controls rotation of a shaft (200) to be actuated. The rotation control apparatus (100) includes a relative position sensor (1) that contactlessly detects a mechanical displacement amount of the shaft to be actuated in a direction of rotation; a plurality of absolute position sensors (2_1 to 2_n) provided at mutually different positions within a rotatable range (SR) of the shaft to be actuated extending from a first position (Pc) to a second position (Po) in the direction of rotation, each of the plurality of absolute position sensors outputting a detection signal when the shaft to be actuated has reached its corresponding position; a position calculating unit (3) that calculates an absolute position of the shaft to be actuated in the direction of rotation on the basis of an integrated value (RP) of the mechanical displacement detected by the relative position sensor since the detection signal has been output and a reference value (AP) indicating a position corresponding to the absolute position sensor that has output the detection signal; an actuation amount calculating unit (4) that calculates an actuation amount (MV) of the shaft to be actuated on the basis of information (SP) on a target position of the shaft to be actuated in the direction of rotation and the absolute position (PV) of the shaft to be actuated calculated by the position calculating unit; and an actuating unit (5) that actuates the shaft to be actuated within the rotatable range of the shaft to be actuated extending from the first position to the second position in the direction of rotation on the basis of the actuation amount calculated by the actuation amount calculating unit. At least one of the plurality of absolute position sensors is provided to correspond to a third position (Pa, Pm, or Pb) excluding the first position and the second position within the rotatable range.

In the above rotation control apparatus, the position calculating unit may reset the integrated value of the mechanical displacement when the detection signal is output from the absolute position sensor.

In the above rotation control apparatus, the third position may be an intermediate point (Pm) between the first position and the second position.

In the above rotation control apparatus, one of the plurality of absolute position sensors may output the detection signal when the shaft to be actuated has reached the first position (the position Pc where the valve lift is 0%).

In the above rotation control apparatus, one of the plurality of absolute position sensors may output the detection signal when the shaft to be actuated has reached the second position (the position Po where the valve lift is 100%).

In the above rotation control apparatus, the shaft to be actuated may be a valve shaft (200) of a control valve, the first position may be a position of the valve shaft in the direction of rotation where the valve lift of the control valve is 0%, the second position may be a position of the valve shaft in the direction of rotation where the valve lift of the control valve is 100%, and the third position may be a position of the valve shaft where the control valve has a valve lift of other than 0% and 100%.

In the above rotation control apparatus, the relative position sensor may be an incremental-type rotary encoder.

In the above rotation control apparatus, the absolute position sensor may be a limit switch.

In the foregoing descriptions, the reference characters in the drawings corresponding to the constituent elements of the disclosure are indicated in parentheses as examples.

On the basis of the foregoing descriptions, the present disclosure makes it possible to reduce the time it takes for origin restoration of a shaft to be actuated and reduce an error in measuring the position of the shaft to be actuated in a rotation control apparatus that measures the position of the shaft to be actuated in the direction of rotation with a contactless relative position sensor.

DETAILED DESCRIPTION

Hereinafter, embodiments of the present disclosure will be described with reference to the drawings. In the following descriptions, constituent elements that are common among the embodiments are given identical reference characters, and duplicate descriptions thereof will be omitted.

First Embodiment

Configuration of Rotation Control Apparatus

Figure 1:
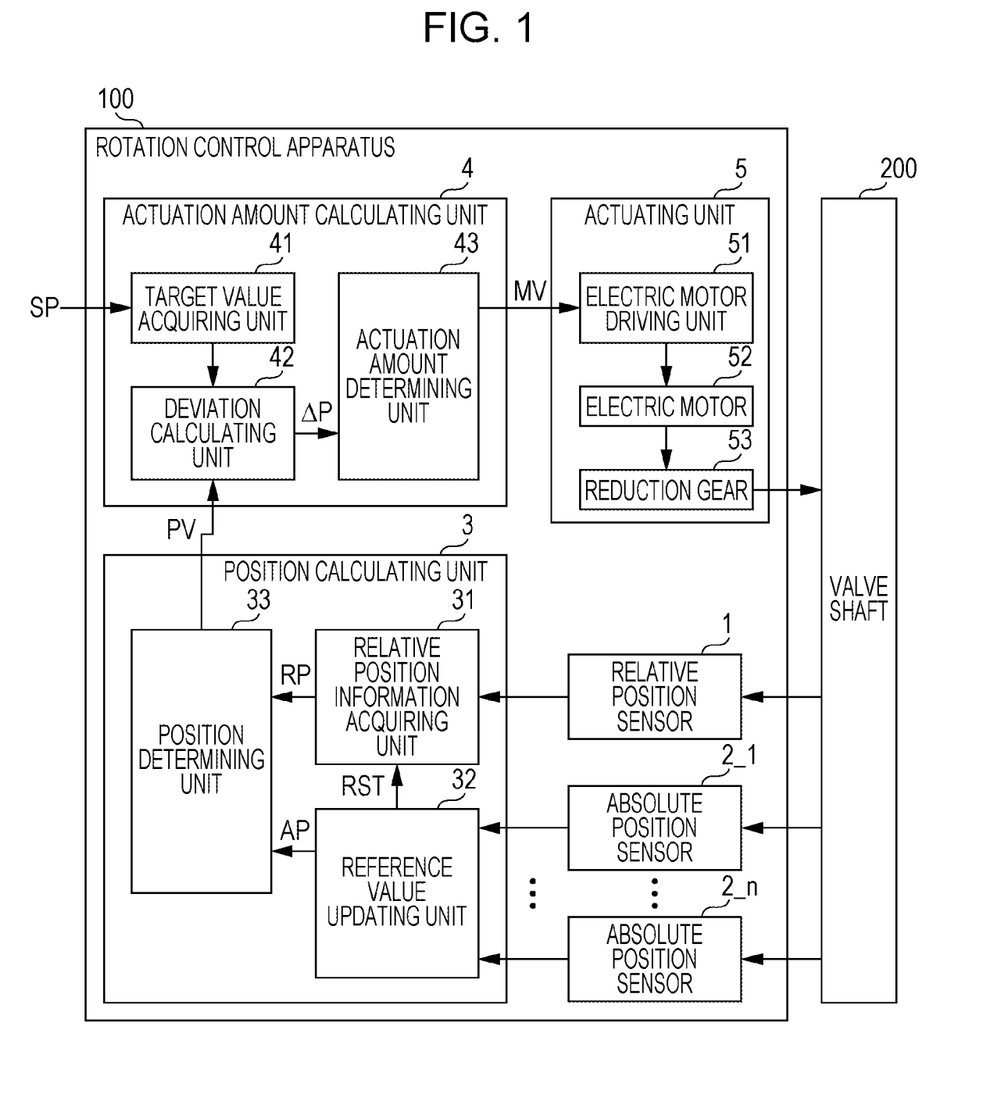
FIG. 1 illustrates a configuration of a rotation control apparatus according to a first embodiment.

FIG. 1 illustrates a configuration of a rotation control apparatus according to a first embodiment.

A rotation control apparatus 100 illustrated in FIG. 1 is, for example, an electric-powered actuator that controls rotation of a valve shaft of a rotary-type control valve, such as a ball valve, to be used in process control of a flow rate in a plant or the like.

Specifically, the rotation control apparatus 100 is an actuator that calculates a deviation ΔP of a measured value PV of the valve lift of a control valve (hereinafter, also referred to as an "actual valve lift") from a target value (set value) SP of the valve lift of the control valve given by a higher apparatus (not illustrated) and performs control to bring the valve lift of the control valve to the target value by driving a valve shaft 200 such that the deviation ΔP is brought to 0.

Hereinafter, a specific configuration of the rotation control apparatus 100 will be described.

As illustrated in FIG. 1, the rotation control apparatus 100 includes a relative position sensor 1, a plurality of absolute position sensors 2_1 to 2_n (n is an integer no smaller than 2), a position calculating unit 3, an actuation amount calculating unit 4, and an actuating unit 5.

These functional units are contained inside a housing made of a metal material, for example. The rotation control apparatus 100 may further include, in addition to the aforementioned functional units, a display unit (e.g., liquid-crystal display) for presenting various pieces of information, such as the valve lift of the control valve, to a user and a communication circuit for transmitting and receiving data to and from an external device.

First, the relative position sensor 1 and the absolute position sensors 2_1 to 2_n for measuring the actual valve lift of the control valve, namely, the position of the valve shaft 200 in the direction of rotation will be described.

The relative position sensor 1 is a functional unit that contactlessly detects a mechanical displacement of the valve shaft 200, serving as a shaft to be actuated by the rotation control apparatus 100, in the direction of rotation. An example of the relative position sensor 1 can be an incremental-type rotary encoder that outputs a pulse corresponding to the angle of rotation of a shaft to be detected (valve shaft 200). In the present embodiment, the description assumes that the relative position sensor 1 is an incremental-type rotary encoder.

The absolute position sensors 2_1 to 2_n are functional units that each output a detection signal when the valve shaft 200, serving as the shaft to be actuated, has reached a predetermined position in the direction of rotation. It suffices that the absolute position sensors 2_1 to 2_n each be constituted by a component that can output an electric signal indicating that the valve shaft 200 has reached a specific position in the direction of rotation.

Specifically, the absolute position sensors 2_1 to 2_n can each be constituted, for example, by a limit switch, a photo-interrupter, or a Hall element. The aforementioned electric signal may be any signal that indicates that the valve shaft 200 has reached a specific position in the direction of rotation, and the electric signal is, for example, an on-off signal (signal that expresses a state, e.g., digital signal).

Figure 2:
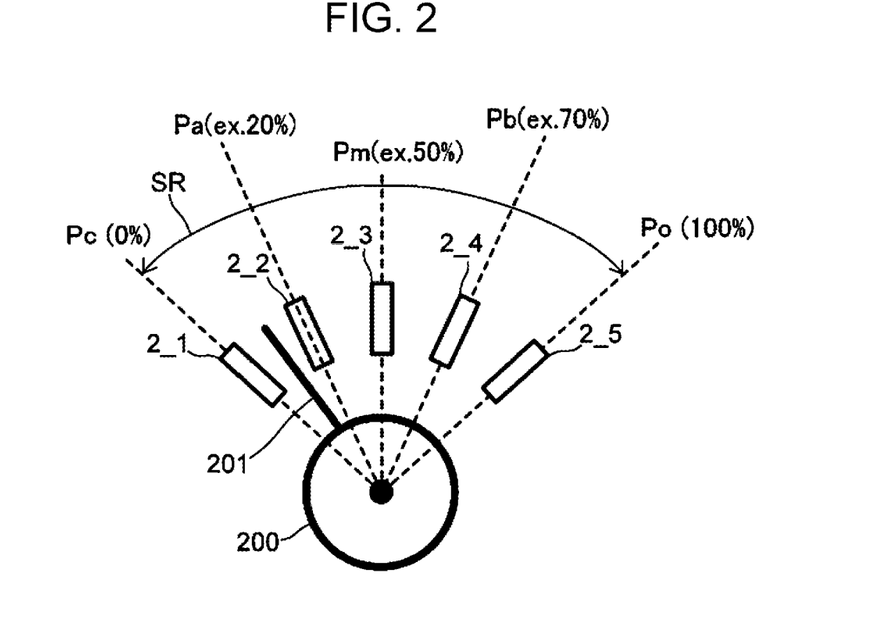
FIG. 2 illustrates an arrangement example of absolute position sensors.

FIG. 2 illustrates an arrangement example of the absolute position sensors 2_1 to 2_n. FIG. 2 illustrates an arrangement example of the absolute position sensors 2_1 to 2_5 with n set to 5.

As illustrated in FIG. 2, the absolute position sensors 2_1 to 2_5 are provided at mutually different positions within a rotatable range SR of the valve shaft 200 and each output a detection signal when the valve shaft 200 has reached its corresponding position.

The rotatable range SR is a movable range of the valve shaft 200 in the direction of rotation and is, for example, a range extending from a fully closed position Pc where the valve lift is 0%, or a first position, to a fully open position Po where the valve lift is 100%, or a second position.

In the rotation control apparatus 100, the absolute position sensors 2_1 to 2_5 are provided to correspond to given positions within a range in which the valve lift varies from 0% to 100%. For example, in the case of the arrangement example illustrated in FIG. 2, the absolute position sensor 2_1 provided to correspond to the fully closed position Pc where the valve lift is 0%. The absolute position sensor 2_2 is provided to correspond to a position Pa where the valve lift is 20%. The absolute position sensor 2_3 is provided to correspond to a position Pm where the valve lift is 50%. The absolute position sensor 2_4 is provided to correspond to a position Pb where the valve lift is 70%. The absolute position sensor 2_5 is provided to correspond to the fully open position Po where the valve lift is 100%.

In the case of the arrangement example illustrated in FIG. 2, the absolute position sensor 2_1 outputs a detection signal when the valve shaft 200 has reached the fully closed position Pc. The absolute position sensor 2_2 outputs a detection signal when the valve shaft 200 has reached the position Pa (where the valve lift is 20%). The absolute position sensor 2_3 outputs a detection signal when the valve shaft 200 has reached the position Pm (where the valve lift is 50%). The absolute position sensor 2_4 outputs a detection signal when the valve shaft 200 has reached the position Pb (where the valve lift is 70%). The absolute position sensor 2_5 outputs a detection signal when the valve shaft 200 has reached the fully open position Po (where the valve lift is 100%).

Next, a specific structure of the absolute position sensors 2_1 to 2_n will be described.

FIGS. 3A to 3E illustrate an example of a specific structure of the absolute position sensors 2_1 to 2_n. Here, a case in which n is 5 is illustrated.

Figure 3A:
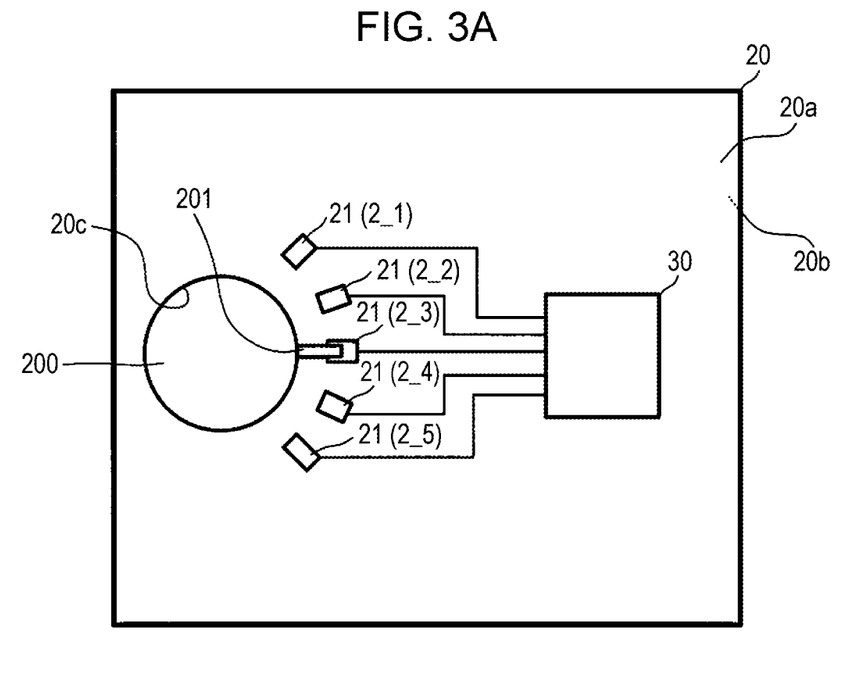
FIG. 3A illustrates an example of a specific structure of an absolute position sensor.
Figure 3B:
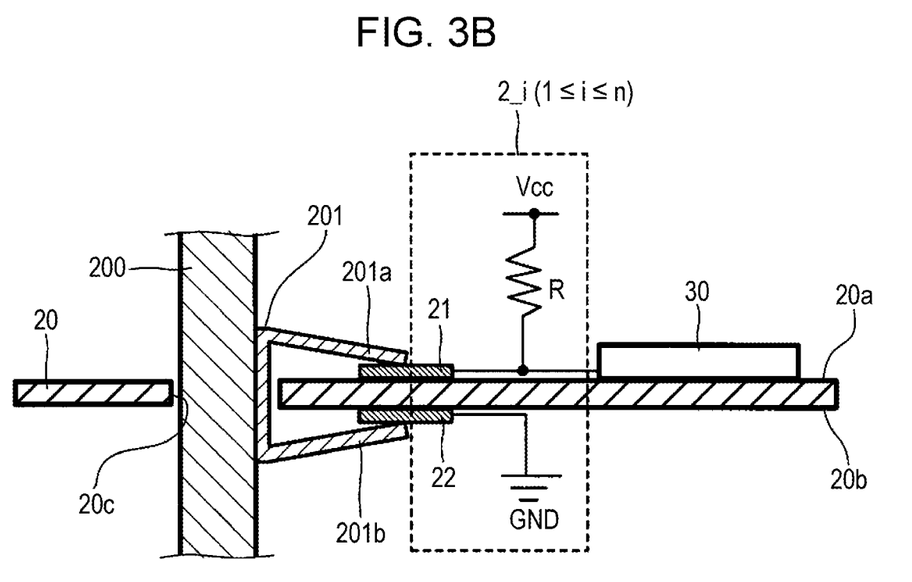
FIG. 3B illustrates an example of a specific structure of an absolute position sensor.
Figure 3C:
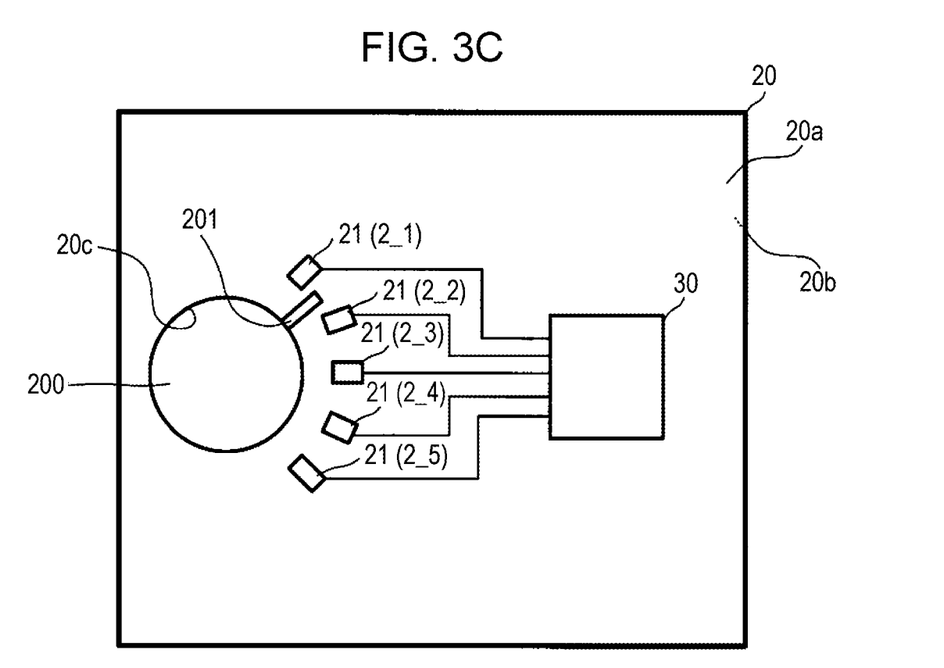
FIG. 3C illustrates an example of a specific structure of an absolute position sensor.
Figure 3D:
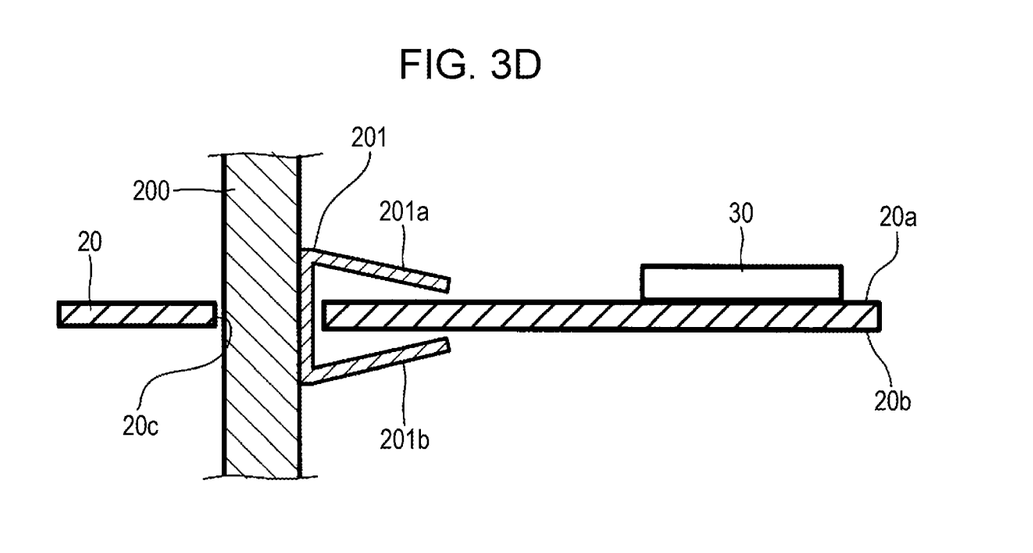
FIG. 3D illustrates an example of a specific structure of an absolute position sensor.
Figure 3E:
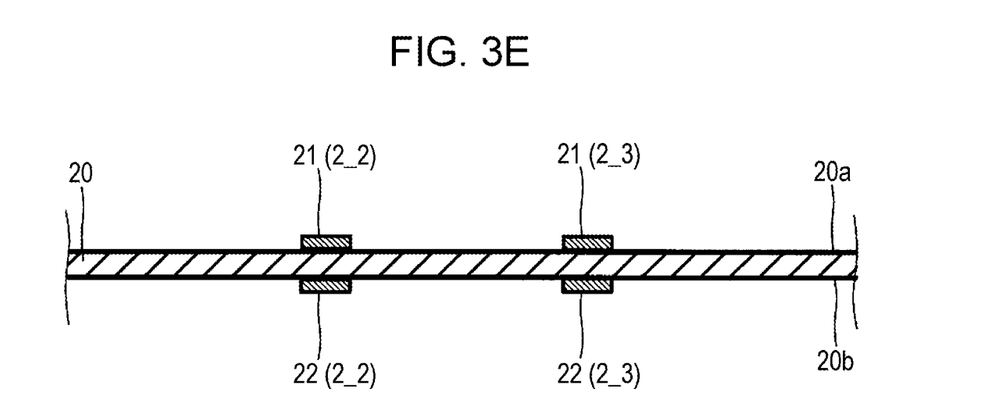
FIG. 3E illustrates an example of a specific structure of an absolute position sensor.

Specifically, FIG. 3A is a plan view schematically illustrating the structure of the absolute position sensors 2_1 to 2_n held when the valve shaft 200 has reached one of the absolute position sensors 2_1 to 2_n. FIG. 3B is a side view schematically illustrating the structure of the absolute position sensors 2_1 to 2_n held when the valve shaft 200 has reached one of the absolute position sensors 2_1 to 2_n. FIG. 3C is a plan view schematically illustrating the structure of the absolute position sensors 2_1 to 2_n held when the valve shaft 200 is not at any of the absolute position sensors 2_1 to 2_n. FIG. 3D is a side view schematically illustrating the structure of the absolute position sensors 2_1 to 2_n held when the valve shaft 200 is not at any of the absolute position sensors 2_1 to 2_n. FIG. 3E is another side view schematically illustrating the structure of the absolute position sensors 2_1 to 2_n.

As illustrated in FIGS. 3A to 3E, for example, an absolute position sensor 2_i (1≤i≤n) can be implemented by a resistance R and two electrodes 21 and 22 disposed on a printed board 20.

Specifically, the electrode 21 is formed on a principal surface 20a of the printed board 20, and the resistance R is connected between the electrode 21 and a power source line Vcc to which a power source voltage is supplied. In addition, the electrode 22 is formed on another principal surface 20b of the printed board 20, and the electrode 22 is connected to a ground line GND to which a ground voltage is supplied. The resistance R may be disposed, for example, on the principal surface 20a of the printed board 20. The power source line Vcc may be formed, for example, on the principal surface 20a of the printed board 20, and the ground line GND may be formed, for example, on the other principal surface 20b of the printed board 20.

An IC chip 30 is disposed on the principal surface 20a of the printed board 20, and the IC chip 30 includes a program processing unit, such as a microcontroller or a central processing unit (CPU), that functions as the position calculating unit 3 and the actuation amount calculating unit 4, which will be described later. A node na at which the resistance R and the electrode 21 described above are connected is connected to one of the input terminals of the IC chip 30.

A through-hole 20c that penetrates through the principal surfaces 20a and 20b is formed in the printed board 20, and the valve shaft 200 is disposed inside the through-hole 20c. A short plate 201 made of metal is bonded to the outer peripheral surface of the valve shaft 200.

As illustrated in FIGS. 3B and 3D, the short plate 201 is formed, for example, into a square-bracket shape as viewed from the front. The short plate 201 is fixed to the valve shaft 200 in a state in which the printed board 20 is interposed between opposing end portions 201a and 201b and rotates along with the valve shaft 200.

As illustrated in FIG. 3A, for example, when the valve shaft 200 rotates and the short plate 201 reaches the position of the absolute position sensor 2_3, the end portion 201a of the short plate 201 makes contact with the electrode 21 of the absolute position sensor 2_3, and the end portion 201b of the short plate 201 makes contact with the electrode 22 of the absolute position sensor 2_3. At this point, a current path extending from the power source line Vcc to the ground line GND through the resistance R, the electrode 21, the short plate 201, and the electrode 22 is formed, and the potential of the node na becomes 0 V (ground potential).

Meanwhile, as illustrated in FIG. 3C, when the valve shaft 200 rotates and the short plate 201 reaches a position between the absolute position sensor 2_1 and the absolute position sensor 2_2, the end portions 201a and 201b of the short plate 201 make contact with none of the electrodes 21 and 22 of the absolute position sensors 2_1 to 2_5. Thus, the potential of the node na of each of the absolute position sensors 2_1 to 2_5 becomes Vcc (power source voltage).

In this manner, a change in the voltage at the node na of each of the absolute position sensors 2_1 to 2_5 is input to the IC chip 30 as a detection signal, and thus whether the valve shaft 200 has reached a predetermined position in the direction of rotation can be determined.

Next, the position calculating unit 3, the actuation amount calculating unit 4, and the actuating unit 5 will be described.

The position calculating unit 3 is a functional unit that calculates an absolute position of the valve shaft 200. The position calculating unit 3 calculates an absolute position of the shaft to be actuated in the direction of rotation on the basis of an integrated value of a mechanical displacement detected by the relative position sensor 1 since the absolute position sensors 2_1 to 2_n have output a detection signal and a reference value indicating the position corresponding to the one of the absolute position sensors 2_1 to 2_n that has output the stated detection signal.

The position calculating unit 3 can be implemented, for example, through program processing of a program processing unit, such as a microcontroller or a CPU. In the case of the example described above, the position calculating unit 3 is implemented by the IC chip 30 mounted on the printed board 20.

To be more specific, the position calculating unit 3 includes a reference value updating unit 32, a relative position information acquiring unit 31, and a position determining unit 33.

The reference value updating unit 32 is a functional unit that, when the absolute position sensors 2_1 to 2_n have output a detection signal, updates a reference value AP and also outputs a reset signal RST.

The reference value AP is a value indicating an absolute position within the rotatable range SR and serves as a reference when the absolute position of the valve shaft 200 in the direction of rotation is calculated.

Specifically, each time the absolute position sensors 2_1 to 2_n output a detection signal, the reference value updating unit 32 sets the reference value AP to a value indicating the position of the one of the absolute position sensors 2_1 to 2_n that has output the stated detection signal. For example, in the case of the example illustrated in FIG. 2, first, the valve shaft 200 rotates to reach the position Pa where the valve lift is 20%, and the absolute position sensor 2_2 outputs a detection signal. Then, the reference value updating unit 32 sets the reference value AP to a value indicating the position Pa corresponding to the absolute position sensor 2_2. Thereafter, the valve shaft 200 further rotates to reach the position Pm where the valve lift is 50%, and the absolute position sensor 2_3 outputs a detection signal. Then, the reference value updating unit 32 changes the reference value AP from the value indicating the position Pa to a value indicating the position Pm corresponding to the absolute position sensor 2_3.

The relative position information acquiring unit 31 is a functional unit that acquires the mechanical displacement amount of the valve shaft 200 in the direction of rotation detected by the relative position sensor 1 and calculates an integrated value RP of the mechanical displacement amount. For example, the relative position information acquiring unit 31 counts pulses output from the incremental-type rotary encoder serving as the relative position sensor 1 and calculates the integrated value RP of the number of these pulses.

In addition, when the reference value updating unit 32 has output a reset signal RST, the relative position information acquiring unit 31 resets the integrated value RP of the number of pulses counted up to that point. After resetting the integrated value RP, the relative position information acquiring unit 31 restarts counting pulses.

In other words, the relative position information acquiring unit 31 resets the integrated value RP each time the absolute position sensors 2_1 to 2_n output a detection signal. Therefore, the integrated value RP calculated by the relative position information acquiring unit 31 is a cumulative value of the number of pulses output from the rotary encoder in a period from an instance of updating the reference value AP to a subsequent instance of updating the reference value AP.

The position determining unit 33 calculates an absolute position of the valve shaft 200 within the rotatable range SR by adding the reference value AP generated by the reference value updating unit 32 with the mechanical displacement amount of the valve shaft 200 in the direction of rotation that is based on the integrated value RP of the number of pulses calculated by the relative position information acquiring unit 31. The position determining unit 33 converts the calculated absolute position of the valve shaft 200 to the valve lift and outputs the converted value as an actual valve lift PV.

The actuation amount calculating unit 4 is a functional unit that calculates an actuation amount of the valve shaft 200 on the basis of the target value SP of the valve lift serving as the target position of the valve shaft 200 in the direction of rotation and the actual valve lift PV calculated by the position calculating unit 3. Similarly to the position calculating unit 3, the actuation amount calculating unit 4 can be implemented, for example, through program processing of a program processing unit, such as a microcontroller or a CPU. In the case of the example described above, the actuation amount calculating unit 4 is implemented by the IC chip 30 mounted on the printed board 20.

Specifically, the actuation amount calculating unit 4 includes a target value acquiring unit 41, a deviation calculating unit 42, and an actuation amount determining unit 43.

The target value acquiring unit 41 is a functional unit that acquires the target value SP of the valve lift given by a higher apparatus (not illustrated) in a valve control system, for example. The target value SP is set through communication from an external controller or a 4-20 mA analog signal, for example.

The deviation calculating unit 42 is a functional unit that calculates the deviation $\Delta P$ of the actual valve lift PV calculated by the position calculating unit 3 from the target value SP of the valve lift acquired by the target value acquiring unit 41.

The actuation amount determining unit 43 calculates an actuation amount MV necessary for the valve shaft 200 to reach the target position in the direction of rotation that is based on the target value SP on the basis of the deviation $\Delta P$ calculated by the deviation calculating unit 42.

The actuating unit 5 is a functional unit that actuates the valve shaft 200 within the rotatable range SR on the basis of the actuation amount MV calculated by the actuation amount calculating unit 4. Specifically, the actuating unit 5 includes an electric motor 52, an electric motor driving unit 51, and a reduction gear 53.

The electric motor 52 is a component that generates rotary force for actuating the valve shaft 200. Examples of the electric motor 52 can include a brushless motor, a stepping motor, and a synchronous motor.

The electric motor driving unit 51 is a functional unit that drives the electric motor 52. Specifically, the electric motor driving unit 51 applies a current (or voltage) corresponding to the actuation amount MV calculated by the actuation amount calculating unit 4 to the electric motor 52 to rotate an output shaft of the electric motor 52.

The reduction gear 53 is a power transmission mechanism that reduces the rotary force generated by the electric motor 52 and transmits the reduced rotary force to the valve shaft 200. For example, the reduction gear 53 is constituted by a gear mechanism of various types, such as a planetary gear mechanism. As the output shaft of the reduction gear 53 is coupled to the valve shaft 200, the valve shaft 200 can be rotated by the rotary force obtained by reducing the rotary force of the electric motor 52 by a predetermined reduction ratio.

Operation Principle of Rotation Control Apparatus 100 According to First Embodiment Next, an operation principle of the rotation control apparatus 100 according to the first embodiment will be described.

First, an operation of the origin restoration in the rotation control apparatus 100 will be described.

Figure 4:
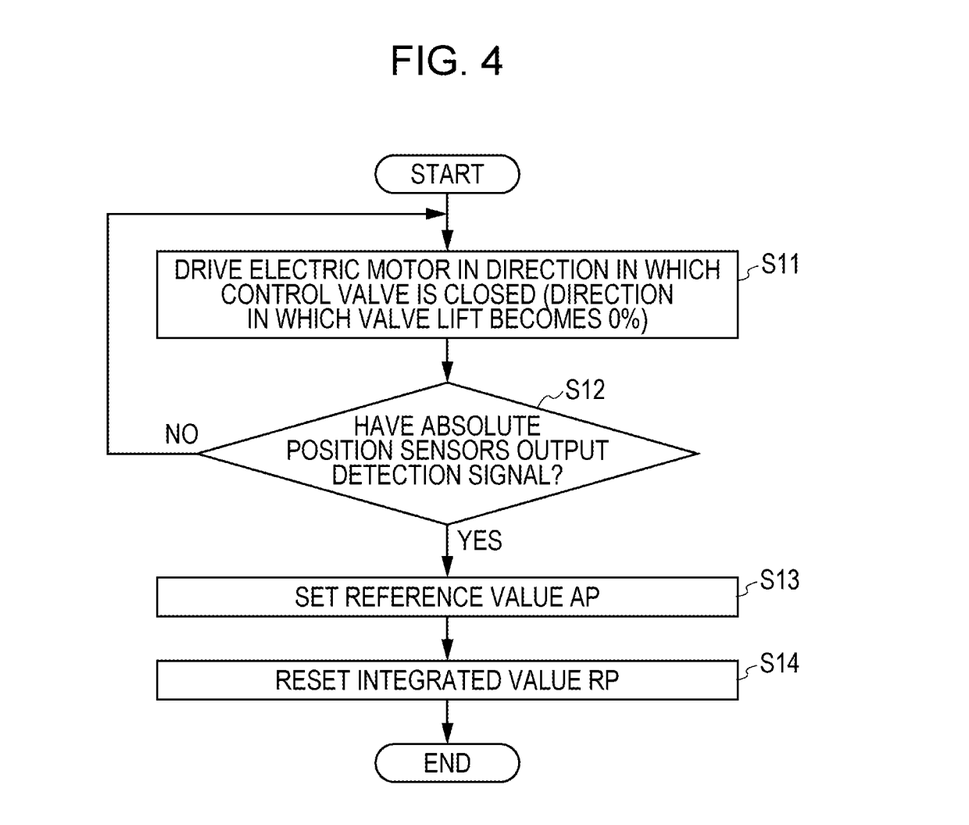
FIG. 4 illustrates a flow of an operation of the rotation control apparatus in an origin restoration operation mode according to the first embodiment.

FIG. 4 illustrates a flow of an operation of the rotation control apparatus 100 in an origin restoration operation mode according to the first embodiment.

The following description is based on an example in which the valve shaft 200 is at a position where the valve lift is 80% when the rotation control apparatus 100 is powered on.

Upon being powered on, the rotation control apparatus 100 starts operating in an origin restoration operation mode in which the rotation control apparatus 100 carries out origin restoration processing of the relative position sensor. In the origin restoration operation mode, the rotation control apparatus 100 drives the electric motor 52 in a direction in which the control valve is closed (S11). Specifically, the electric motor driving unit 51 drives the electric motor 52 on the basis of the actuation amount MV calculated by the actuation amount determining unit 43 to bring the valve lift to 0%.

Next, the rotation control apparatus 100 determines whether the absolute position sensors 2_1 to 2_n have output a detection signal (S12). If the absolute position sensors 2_1 to 2_n have output no detection signal in step S12, the rotation control apparatus 100 continues to drive the electric motor 52 to bring the valve lift to 0%.

Meanwhile, if the absolute position sensors 2_1 to 2_n have output a detection signal in step S12, the rotation control apparatus 100 sets the position corresponding to the one of the absolute position sensors 2_1 to 2_n that has output the detection signal as the reference value AP (initial point) to be used when calculating the absolute position of the valve shaft 200 (S13).

For example, in the case of the example illustrated in FIG. 2, in step S11, the valve shaft 200 rotates from the position where the valve lift is 80% into the direction that brings the valve lift to 0%. Thereafter, the absolute position sensor 2_4 outputs a detection signal when the valve shaft 200 has reached the position Pb where the valve lift is 70%. At this point, the reference value updating unit 32 of the position calculating unit 3 sets the value indicating the position Pb corresponding to the absolute position sensor 2_4 that has output the detection signal as the reference value AP and also outputs a reset signal RST.

Upon receiving the reset signal RST from the reference value updating unit 32, the relative position information acquiring unit 31 resets the integrated value RP of the number of pulses counted up to that point (S14).

Thus, the origin restoration processing is completed, and the rotation control apparatus 100 shifts from the origin restoration operation mode to a normal operation mode.

Next, an operation of the rotation control apparatus 100 in the normal operation mode following the origin restoration will be described.

Figure 5:
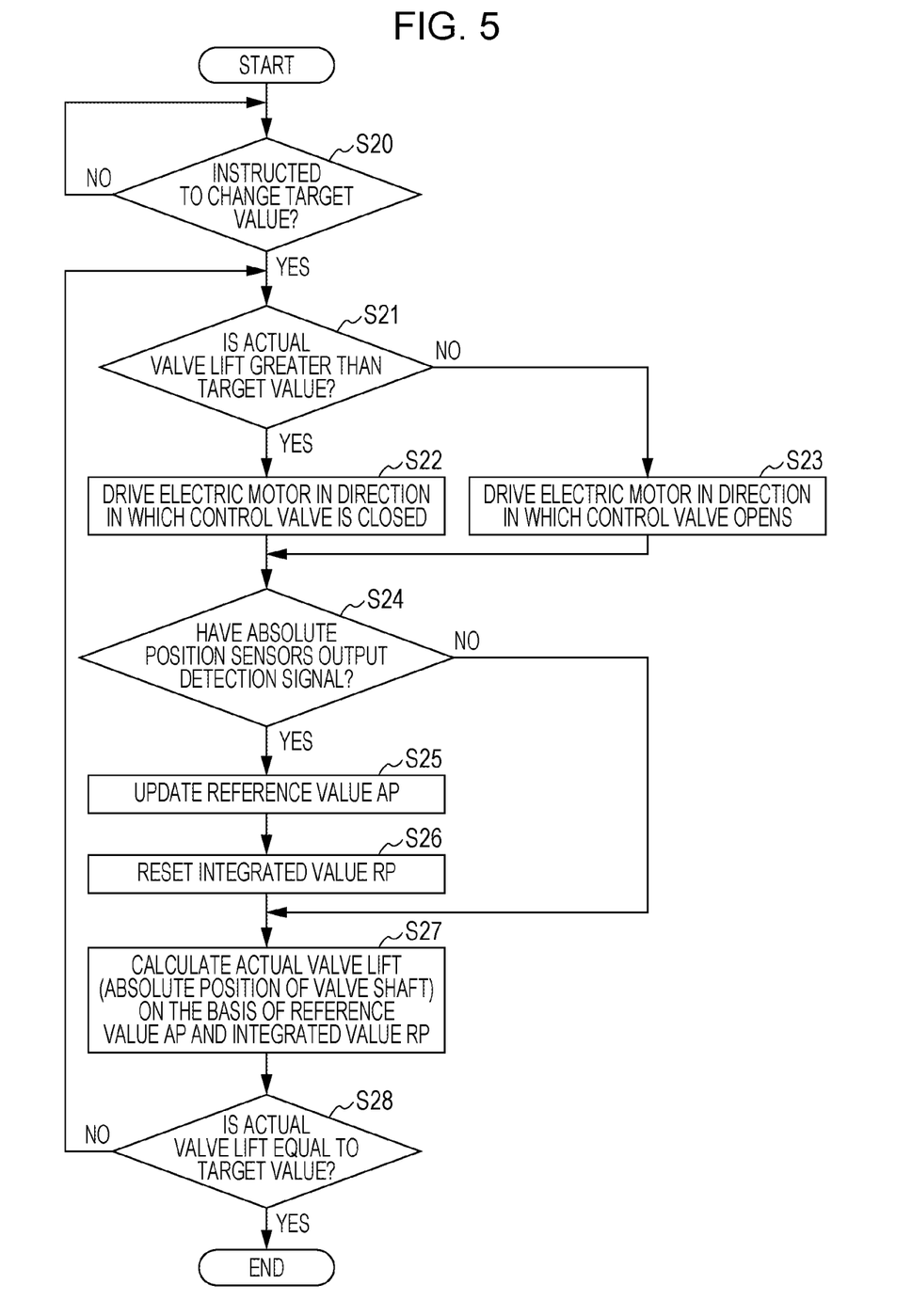
FIG. 5 is a flowchart illustrating a flow of an operation of the rotation control apparatus in a normal operation mode according to the first embodiment.

FIG. 5 is a flowchart illustrating a flow of an operation of the rotation control apparatus in the normal operation mode according to the first embodiment.

Upon the origin restoration operation mode being terminated, the rotation control apparatus 100 shifts to the normal operation mode. In the normal operation mode, the rotation control apparatus 100 stands by until the rotation control apparatus 100 is instructed to change the target value SP of the valve lift by the higher apparatus (S20). Upon the rotation control apparatus 100 being instructed to change the target value SP of the valve lift, the deviation calculating unit 42 of the rotation control apparatus 100 determines whether the actual valve lift PV that is based on the absolute position of the valve shaft 200 calculated by the position calculating unit 3 is greater than the target value SP instructed by the higher apparatus (S21).

If the actual valve lift PV is greater than the target value SP in step S21, the rotation control apparatus 100 drives the electric motor 52 in a direction in which the control valve is closed (S22). Specifically, the actuation amount determining unit 43 calculates the actuation amount MV that brings the valve lift to the target value SP on the basis of the deviation $\Delta P$ calculated by the deviation calculating unit 42, and the electric motor driving unit 51 drives the electric motor 52 on the basis of the calculated actuation amount MV.

Meanwhile, if the actual valve lift PV is smaller than the target value SP in step S21, the rotation control apparatus 100 drives the electric motor 52 in a direction in which the control valve opens (S23). Specifically, the actuation amount determining unit 43 calculates the actuation amount MV that brings the valve lift to the target value SP on the basis of the deviation ΔP calculated by the deviation calculating unit 42, and the electric motor driving unit 51 drives the electric motor 52 on the basis of the calculated actuation amount MV.

After step S22 or step S23, the rotation control apparatus 100 determines whether the absolute position sensors 2_1 to 2_n have output a detection signal (S24).

If the absolute position sensors 2_1 to 2_n have output no detection signal in step S24, the rotation control apparatus 100 calculates the actual valve lift PV (absolute position of the valve shaft 200) on the basis of the reference value AP set by the reference value updating unit 32 in an immediately preceding instance and the mechanical displacement amount of the valve shaft 200 that is based on the integrated value RP of the number of pulses output from the relative position sensor 1 calculated by the relative position information acquiring unit 31 (S27).

For example, if no detection signal has been output from the absolute position sensors 2_1 to 2_n since the origin restoration processing (steps S11 to S14) described above, the rotation control apparatus 100 calculates the actual valve lift PV by adding the mechanical displacement amount of the valve shaft 200 that is based on the integrated value RP calculated by the relative position information acquiring unit 31 to the reference value AP (in the case of the example described above, the position where the valve lift is 70%) set in step S13 in the origin restoration operation mode.

Meanwhile, if the absolute position sensors 2_1 to 2_n have output a detection signal in step S24, the rotation control apparatus 100 updates the reference value AP (S25). Specifically, the reference value updating unit 32 sets the position corresponding to the one of the absolute position sensors 2_1 to 2_n that has output the detection signal to a new reference value AP. For example, if the absolute position sensor 2_3 has output a detection signal in step S24 immediately after the reference value AP has been set to the value indicating the position Pb (where the valve lift is 70%) in the origin restoration operation mode described above, the reference value updating unit 32 changes the reference value AP from the value indicating the position Pb (where the valve lift is 70%) to a value indicating the position Pm (where the valve lift is 50%). At this point, the reference value updating unit 32 also outputs a reset signal RST.

Upon receiving the reset signal RST from the reference value updating unit 32, the relative position information acquiring unit 31 resets the integrated value RP of the number of pulses output from the relative position sensor 1 counted up to that point (S26).

Next, the rotation control apparatus 100 calculates the actual valve lift PV (absolute position of the valve shaft 200) on the basis of the reference value AP set by the reference value updating unit 32 in step S25 and the integrated value RP counted by the relative position information acquiring unit 31 since the integrated value RP has once been reset in step S26 (S27). For example, if the reference value AP has been changed to the value indicating the position Pm (where the valve lift is 50%) in step S25, the rotation control apparatus 100 calculates the absolute position of the valve shaft 200 by adding the mechanical displacement amount of the valve shaft 200 that is based on the integrated value RP counted by the relative position information acquiring unit 31 since step S26 to the stated reference value AP and calculates the actual valve lift PV from the calculated absolute position.

Next, the rotation control apparatus 100 determines whether the actual valve lift PV calculated in step S27 matches the target value SP (S28).

If the actual valve lift PV does not match the target value SP in step S28, the processing returns to step S21, and the rotation control apparatus 100 again carries out the processing (S21 to S27) described above. Meanwhile, if the actual valve lift PV matches the target value SP in step S28, the rotation control apparatus 100 terminates the processing of setting the valve lift to the target value.

Advantageous Effects of Rotation Control Apparatus 100 According to First Embodiment As described above, the rotation control apparatus 100 according to the present disclosure includes the contactless relative position sensor 1 serving as a position sensor for measuring the position of the valve shaft 200 in the direction of rotation as well as the absolute position sensors 2_2 to 2_4 that output detection signals when the valve shaft 200 has reached third positions (Pa, Pm, and Pb, respectively) excluding the fully closed position Pc and the fully open position Po. The rotation control apparatus 100 calculates an absolute position of the valve shaft 200 in the direction of rotation on the basis of the reference value AP indicating the position of the one of the absolute position sensors 2_2 to 2_4 that has output the detection signal and the integrated value RP of the mechanical displacement detected by the relative position sensor 1 since the detection signal has been output.

According to this configuration, not only the fully closed position Pc and the fully open position Po but also the third positions can be regarded as the reference point for measuring the position of the valve shaft 200, namely, the "origin." Thus, as compared to the case in which only the fully closed position Pc or the fully open position Po is set as the origin, the time required for the origin restoration processing can be reduced.

Specifically, when n absolute position sensors 2_1 to 2_n are disposed within the rotatable range SR, the time T required to restore the valve shaft 200 located at the fully open position Po when the rotation control apparatus 100 is powered on to the origin is expressed by the following expression (1). Below, Tf is the time (full stroke time) required to move the valve shaft from the fully open position to the fully closed position.

$$T = \frac{Tf}{n-1} \qquad (1)$$

For example, when five (n=5) absolute position sensors 2_1 to 2_5 are disposed and the full stroke time Tf is 60 [seconds], the time T required to restore the valve shaft 200 located at the fully open position Po to the origin is 60/(5−1)=15 [seconds].

In this manner, the rotation control apparatus 100 according to the present disclosure can reduce the time required to restore the valve shaft 200 to the origin as necessitated when an incremental-type rotary encoder is used as the relative position sensor 1.

In addition, the rotation control apparatus 100 according to the present disclosure carries out processing similar to the origin restoration each time the valve shaft 200 passes through one of the third positions excluding the fully closed position Pc and the fully open position Po. Specifically, when, with n set to 5, the absolute position sensors 2_2 to 2_4 have output a detection signal, the rotation control apparatus 100 updates the reference value AP to a value indicating the position corresponding to the one of the absolute position sensors 2_2 to 2_4 that has output the detection signal and also resets the integrated value RP.

According to this configuration, even when the rotation control apparatus 100 is operated for an extended period of time, an error in measuring the mechanical displacement amount of the valve shaft 200 by the relative position sensor 1 can be reduced. As described above, the stated error could arise as backlash of a gear constituting the reduction gear 53 or the like accumulates, as the electric motor goes out of step when the electric motor, such as a stepping motor or a synchronous motor, is used as the electric motor 52 in an open loop, or as the power source frequency fluctuates when a synchronous motor is used, for example. Thus, the valve lift of the control valve can be controlled more accurately.

In addition, according to the rotation control apparatus 100, as the plurality of absolute position sensors 2_1 to 2_n are provided, even when a failure occurs in one of the absolute position sensors 2_1 to 2_n, the valve lift can continue to be controlled with the remaining ones of the absolute position sensors 2_1 to 2_n. Thus, the reliability of the rotation control apparatus 100 can be improved.

In addition, providing a greater number of absolute position sensors 2_1 to 2_n within the rotatable range SR makes it possible to further reduce the time required for the origin restoration as well as an error in measuring the mechanical displacement amount of the valve shaft 200 by the relative position sensor 1.

Extension of Embodiments

Thus far, the disclosure made by the present inventor has been described in concrete terms on the basis of an embodiment, but the present disclosure is not limited to the above, and it is needless to say that various modifications can be made within the scope that does not depart from the spirit of the present disclosure.

For example, the foregoing embodiment illustrates a case in which five absolute position sensors 2_1 to 2_5 are provided, but the number of absolute position sensors to be provided is not limited to five. Hereinafter, another arrangement example of the absolute position sensors will be illustrated.

Figure 6:
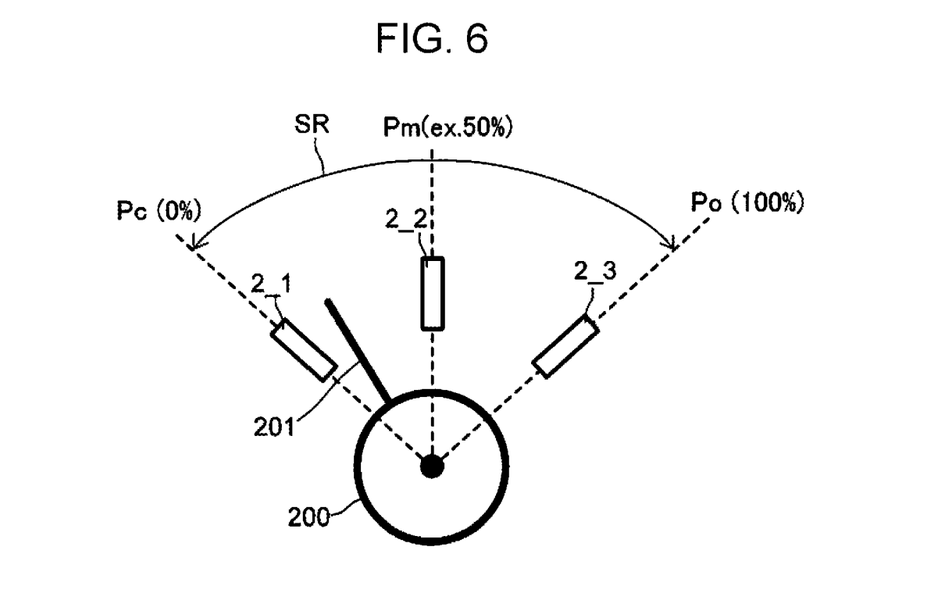
FIG. 6 illustrates another arrangement example of absolute position sensors.

FIG. 6 illustrates another arrangement example of the absolute position sensors.

FIG. 6 illustrates a case in which, with n set to 3, the absolute position sensor 2_1 is disposed at the fully closed position Pc where the valve lift is 0%, the absolute position sensor 2_2 is disposed at an intermediate point between the fully closed position Pc and the fully open position Po, namely, the position Pm where the valve lift is 50%, and the absolute position sensor 2_3 is disposed at the fully open position Po where the valve lift is 100%.

According to this configuration, the origin restoration (updating of the reference value AP) is carried out when the valve shaft 200 has reached the fully closed position Pc, the fully open position Po, or the position Pm on the intermediate point between the fully closed position Pc and the fully open position Po. Thus, as compared to the case in which the origin of the valve shaft 200 is set only to the fully closed position Pc or the fully open position Po, the time required for the origin restoration and an error in measuring the mechanical displacement amount by the relative position sensor 1 can be reduced. In addition, an additional cost incurred by installing more absolute position sensors can be suppressed.

In FIG. 6, absolute position sensors need not be provided on both the fully closed position Pc where the valve lift is 0% and the fully open position Po where the valve lift is 100%, and an absolute position sensor may be provided on either one of the fully closed position Pc and the fully open position Po.

Figure 7:
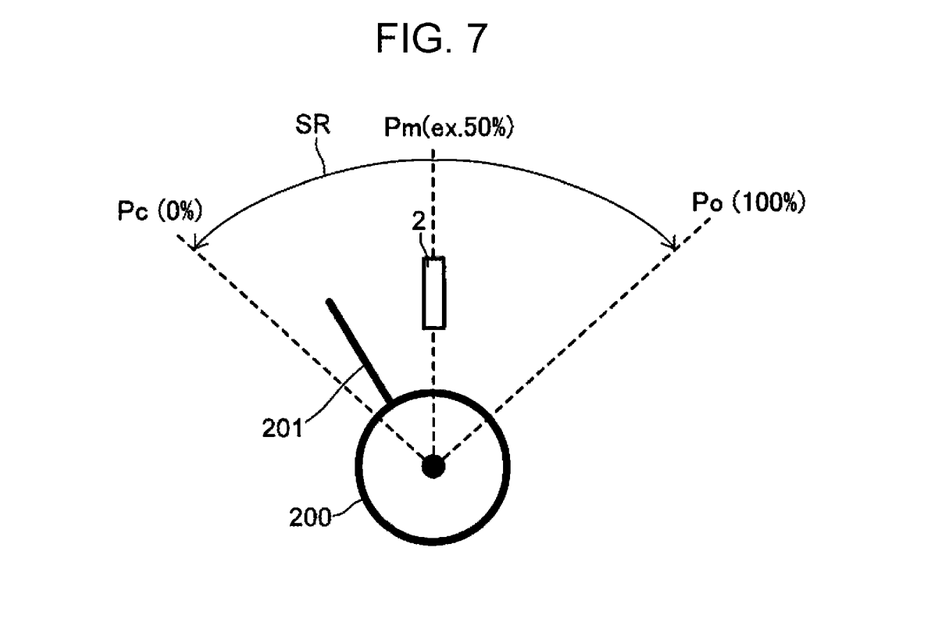
FIG. 7 illustrates another arrangement example of absolute position sensors.

FIG. 7 illustrates yet another arrangement example of the absolute position sensors.

FIG. 7 illustrates a case in which one absolute position sensor 2 is disposed at the position Pm where the valve lift is 50%.

According to this configuration, the origin restoration is carried out when the valve shaft 200 has reached the position Pm on the intermediate point between the fully closed position Pc and the fully open position Po. Thus, as compared to the case in which the origin is set only to the fully closed position Pc or the fully open position Po, the time required for the origin restoration and an error in measuring the mechanical displacement amount by the relative position sensor 1 can be reduced. In addition, since only one absolute position sensor needs to be provided, an additional cost or the like incurred by providing more absolute position sensors can be further suppressed.

The foregoing embodiment illustrates a case in which an incremental-type rotary encoder is used as the relative position sensor 1, but any component that can contactlessly detect a mechanical displacement of a shaft to be actuated in the direction of rotation can be used as the relative position sensor 1. For example, when a brushless motor is used as the electric motor 52, a signal output from a Hall element (Hall IC) constituting the brushless motor can be used as the relative position sensor 1.

When a stepping motor is used as the electric motor 52, the relative position sensor 1 need not be separately provided, and the position calculating unit 3 can count a pulse signal for driving the stepping motor to thus calculate the mechanical displacement amount of a shaft to be actuated in the direction of rotation.

When a synchronous motor is used as the electric motor 52, the relative position sensor 1 need not be separately provided, and the mechanical displacement amount of a shaft to be actuated in the direction of rotation can still be calculated. For example, the driving time in which the synchronous motor is driven is T [s], the rotation speed is N [rpm], and the reduction ratio of the reduction gear is 1/G. Then, the angle of rotation Φ [°] is expressed by (T×N×360)/(60×G). Therefore, as the position calculating unit 3 performs the above calculation, the mechanical displacement amount of the shaft to be actuated in the direction of rotation can be calculated.

The foregoing embodiment illustrates a case in which the rotation control apparatus 100 is applied to an electric-powered actuator that actuates the valve shaft 200 of the control valve, but the shaft to be actuated by the rotation control apparatus 100 is not limited to a valve shaft, and the rotation control apparatus 100 can be applied to any valve lift measurement system that uses a relative position sensor in a rotation control apparatus. For example, the rotation control apparatus 100 can be applied to an actuator for a damper that actuates a damper shaft.

Figure 8:
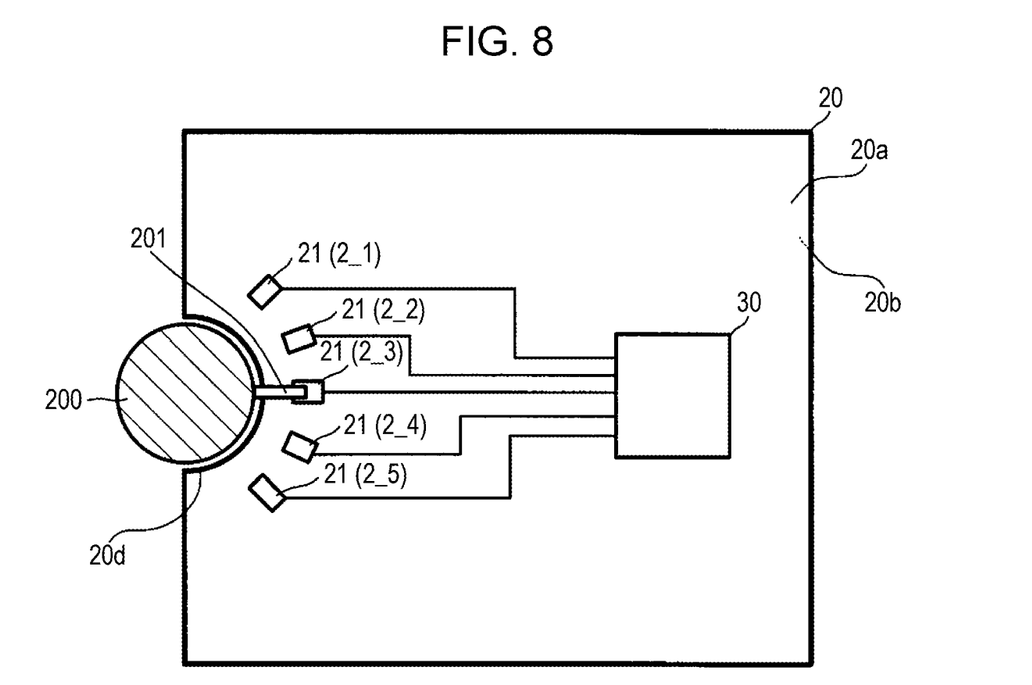
FIG. 8 illustrates an example of another specific structure of an absolute position sensor.

The foregoing embodiment illustrates a case in which the valve shaft 200 is disposed inside the through-hole 20c formed in the printed board 20, but this is not a limiting example. For example, as illustrated in FIG. 8, a semicircular notch 20d may be provided in one side of the printed board 20 as viewed from the above, for example, and the valve shaft 200 may be disposed in this notch 20d. In this case, the electrode 21 may be disposed in the vicinity of the notch 20d on the principal surface 20a of the printed board 20.

What is claimed is:

1. A rotation control apparatus that controls rotation of a shaft, the rotation control apparatus comprising:
   a relative position sensor to contactlessly detect a mechanical displacement of the shaft in a direction of rotation;
   a plurality of absolute position sensors provided at mutually different positions within a rotatable range of the shaft extending from a first position to a second position in the direction of rotation, each of the plurality of absolute position sensors outputting a detection signal when the shaft reaches its corresponding position;
   processing circuitry configured to
      calculate an absolute position of the shaft in the direction of rotation based on an integrated value of the mechanical displacement detected by the relative position sensor since the detection signal was output and a reference value indicating a position corresponding to the absolute position sensor that output the detection signal; and
      calculate an actuation amount of the shaft based on information on a target position of the shaft in the direction of rotation and the calculated absolute position of the shaft; and
   an actuator to actuate the shaft within the rotatable range of the shaft extending from the first position to the second position in the direction of rotation based on the calculated actuation amount,
   wherein at least one of the plurality of absolute position sensors is provided to correspond to a third position excluding the first position and the second position within the rotatable range.

2. The rotation control apparatus according to claim 1, wherein the processing circuitry is further configured to reset the integrated value of the mechanical displacement when the detection signal is output from the absolute position sensor.

3. The rotation control apparatus according to claim 1, wherein at least one of the plurality of absolute position sensors is provided to correspond to the third position, which is an intermediate point between the first position and the second position.

4. The rotation control apparatus according to claim 1, wherein one of the plurality of absolute position sensors outputs the detection signal when the shaft reaches the first position.

5. The rotation control apparatus according to claim 1, wherein one of the plurality of absolute position sensors outputs the detection signal when the shaft reaches the second position.

6. The rotation control apparatus according to claim 1, wherein the shaft is a valve shaft of a control valve,
   wherein the first position is a position of the valve shaft in the direction of rotation where a valve lift of the control valve is 0%,
   wherein the second position is a position of the valve shaft in the direction of rotation where the valve lift of the control valve is 100%, and
   wherein the third position is a position of the valve shaft where the control valve has a valve lift of other than 0% and 100%.

7. The rotation control apparatus according to claim 1, wherein the relative position sensor is an incremental-type rotary encoder.

8. The rotation control apparatus according to claim 1, wherein the absolute position sensor is a limit switch.

9. A rotation control apparatus that controls rotation of a shaft, the rotation control apparatus comprising:
   a relative position sensor to contactlessly detect a mechanical displacement of the shaft in a direction of rotation;
   an absolute position sensor that outputs a detection signal when the shaft reaches a third position excluding a first position and a second position within a rotatable range of the shaft extending from the first position to the second position in the direction of rotation;
   processing circuitry configured to calculate an absolute position of the shaft in the direction of rotation based on an integrated value of the mechanical displacement detected by the relative position sensor since the detection signal was output and a reference value indicating a position corresponding to the absolute position sensor that output the detection signal; and
   calculate an actuation amount of the shaft based on information on a target position of the shaft in the direction of rotation and the calculated absolute position of the shaft; and
   an actuator to actuate the shaft within the rotatable range of the shaft extending from the first position to the second position in the direction of rotation based on the calculated actuation amount.

10. The rotation control apparatus of claim 9, wherein the processing circuitry is further configured to reset the integrated value of the mechanical displacement when the detection signal is output from the absolute position sensor.

11. The rotation control apparatus of claim 9, wherein the relative position sensor is an incremental-type rotary encoder.

12. The rotation control apparatus of claim 9, wherein the absolute position sensor is a limit switch.

13. The rotation control apparatus of claim 1, wherein the actuator includes an electric motor.

14. The rotation control apparatus of claim 9, wherein the actuator includes an electric motor.

* * * * *